Nov. 23, 1965     P. D. CHEATHAM     3,219,357

SLED ATTACHMENT

Filed Sept. 12, 1962

INVENTOR

PRINCE D. CHEATHAM

BY *Jones & Young*

AGENTS

United States Patent Office 3,219,357
Patented Nov. 23, 1965

3,219,357
SLED ATTACHMENT
Prince D. Cheatham, P.O. Box 1172, Burlington, N.C.
Filed Sept. 12, 1962, Ser. No. 223,137
1 Claim. (Cl. 280—8)

The present invention relates to a sled construction, and more particularly to a sled construction having an attachment thereon for converting the sled from a runnered vehicle to a wheeled vehicle, thus permitting year round use of the sled.

Sleds, as normally marketed, are sold only as runnered vehicles thereby possessing use only during the winter months when snow is on the ground. This fact thus restricts the use of sleds throughout the greater part of the country to only relatively short periods of the year. As a result of such limited and infrequent use, the ownership of a sled in relation to its use makes it an expensive item.

There have been many attempts made heretofore to provide means for converting a runnered sled into a wheeled vehicle, thus permitting year round use of the sled. While these prior attempts have met with varying degrees of success, they have possessed various disadvantages which have materially detracted from their general acceptance. For example, certain forms of prior sled attachments have merely placed the wheels in locked position on the sled runners. This type of construction is inherently dangerous since a problem of properly steering the wheeled sled arises. Other forms of attachments have included means for steering the wheels to insure proper safety, but such steering means have materially increased the complexity of the attachments. Moreover, such attachments with independent steering means are comparatively expensive, which has correspondingly detracted from their use.

It is therefore a principal object of the present invention, in the elimination of the foregoing and related disadvantages, to provide a sled construction having a new and novel attachment for converting the sled into a wheeled vehicle for year round use.

Another object of the present invention is the provision of an attachment for converting a sled into a wheeled vehicle which requires no independent steering mechanism.

A further object of the present invention is the provision of an attachment for converting a sled into a wheeled vehicle which permits the steering of the sled in a new and novel manner.

A still further object of the present invention is the provision of an attachment for converting a sled into a wheeled vehicle which is sturdy in construction, extremely simple in design, and cheap in cost.

Yet another object of the present invention is the provision of an attachment for converting a sled into a wheeled vehicle which possesses relatively few parts and may be assembled to the sled in a matter of minutes, or removed therefrom in a like manner, even by a child.

Other and additional objects of the present invention will become manifest from the ensuing description taken in conjunction with the accompanying drawings.

Broadly stated, the attachment for converting a runnered sled into a wheeled vehicle in accordance with the present invention comprises a rear axle, means for fixedly mounting said axle in transverse relationship to the runners of the sled, a front axle, means for mounting said front axle in transverse, longitudinally movable relationship to the runners, means normally urging said front axle rearwardly in the direction of said rear axle, a wheel rotatably mounted to each end of the rear and front axles, and steering line means connected at one end to each side of said front axle with the other end adapted to be connected to the steering bar of the sled.

To the accomplishment of the foregoing and related ends, the present invention then consists of the means hereinafter fully described and particularly pointed out in the claim, the annexed drawings and the following description setting forth in detail certain means in the carrying out of the invention, such disclosed means illustrating, however, but one of various ways in which the principle of the invention may be employed.

The present invention is illustrated, by way of example, in the accompanying drawings, in which.

Figure 1:
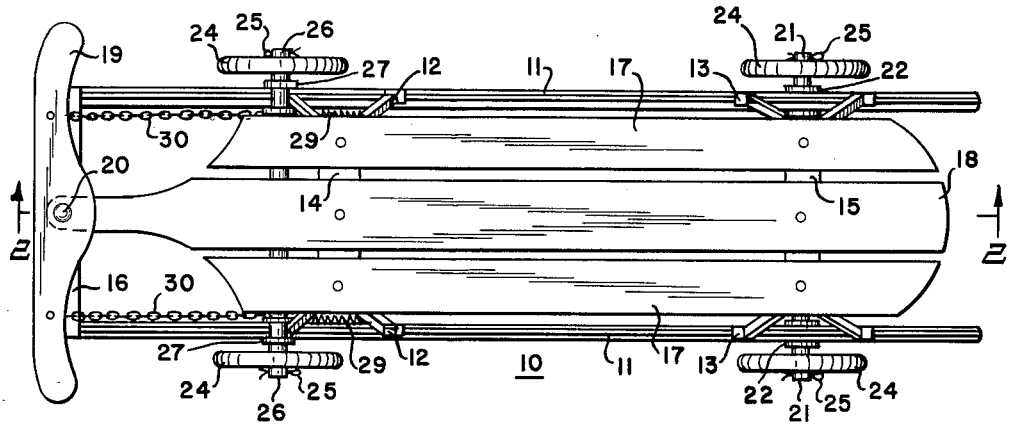
FIGURE 1 is a top plan view of a sled with the attachment made in accordance with the present invention mounted thereon.
Figure 2:
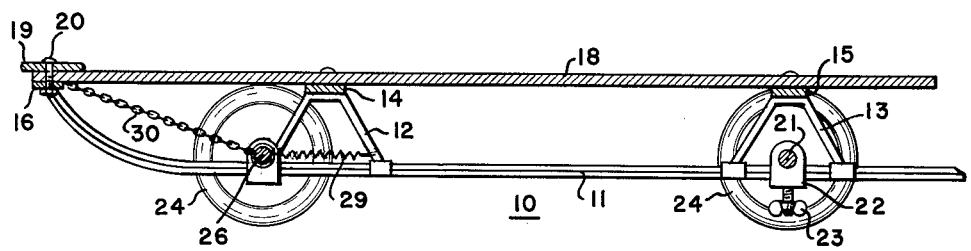
FIG. 2 is a side elevation of the sled and attachment shown in FIG. 1.

Referring now to the drawing, and with particular reference to FIGS. 1 and 2, a sled, generally designated by reference numeral 10, is shown with the attachment for converting the sled into a wheeled vehicle and made in accordance with the present invention mounted thereon. The sled 10 may be of any suitable construction, which includes a pair of spaced runners, a platform mounted thereon, and a steering bar at the forward end thereof.

As illustrated, the sled 10 exemplifies a typical or conventional sled construction and includes a pair of laterally spaced, parallel metal runners 11 having their forward ends curved upwardly. A front A-shaped metal frame member 12 and a rear A-shaped metal frame member 13 are secured at their wide portion to each of runners 11 in longitudinally spaced relationship by any suitable means, such as, for example, riveting, bolting, welding, or the like, and extend upwardly therefrom in vertical alignment therewith. A connecting block 14 of wood or metal is mounted by any suitable means, such as, for example, a nut and bolt or rivet, on the free or narrow end of each of the front A-shaped frame members 12 of the runners 11, and spans the distance therebetween in transverse relationship thereto. Similarly, a like connecting block 15 is mounted in a similar manner on each of the rear A-shaped frame members 13 in transverse relationship thereto and spans the distance therebetween. A bar or metal plate 16 is connected at its opposite ends to the free end of the upwardly curved portion of each of the runners 11 by any suitable means, such as, for example, riveting, bolting, welding, or the like, and serves to connect the curved portions of the runners 11 to one another.

A pair of side frame members 17, preferably made of wood, are connected adjacent their respective ends to the top surface of the connecting blocks 14 and 15 and to the A-shaped frame members 12 and 13 by any suitable means, such as, for example, riveting, bolting, and the like. A central frame member 18 similarly made of wood is disposed between the side members 17 in slightly spaced relation thereto and connected likewise to the connecting blocks 14 and 15. The central frame member 18 is of a length greater than the side frame members 17 and has its forward end connected to the connecting plate 16 centrally thereof. This assembly results in a top platform on which the sled operator may sit or lie. To provide the necessary steering mechanism, a steering bar 19 is connected at its medial portion to the forward free end of the central portion 18 and the medial portion of the connecting bar 16 in pivotal relationship thereto by means of a nut and bolt assembly 20. The steering bar 19 will pivot to the right or left in a horizontal plane about the nut and bolt assembly 20.

The illustrative embodiment of the attachment made in accordance with the present invention for converting the sled 10 into a wheeled vehicle comprises a rear axle 21 fixedly secured to each of the runners 11 in transverse relationship thereto immediately adjacent the rear A-shaped frame members 13. As illustrated, the mounting of the rear axle 21 to the runners 11 is accomplished by providing a U-shaped yoke member 22 having a width between its side walls just greater than the width of the runners 11 to accommodate same therebetween. The upper free ends of the spaced side walls of each of the yoke members 22 are provided with axially aligned apertures through which each end of the rear axle 21 will extend beyond each of the runners 11 and in transverse relationship thereto. The bottom portion of each of the U-shaped yoke members 22 is provided with a threaded aperture into which a locking bolt 23 is threadedly positioned to engage the undersurface of each of the runners 11 to lock each of the yoke members 22 in fixed position between the bottom surface of each of the runners 11 and the rear axle 21. A wheel 24 is mounted on each free end of the rear axle 21 in rotatable relationship thereon and is held in nonreleasable relationship therewith by a cotter pin 25 extending through an aperture provided in each end of the axle 21. It is to be clearly understood that the assembly just described for fixedly securing the rear wheels on the rear of the sled is illustrative in character only, and that there are other constructions readily apparent and available to accomplish this purpose.

To mount a pair of wheels on the front of the sled 10, a front axle 26 identical with the rear axle 21 is mounted in transverse relationship to runners 11 immediately forward of the front A-shaped frame members 12 by means of a U-shaped yoke member 27 provided on each of the runners 11. The front yoke members 27 are the same as the rear yoke members 22 mounted on the rear axle 21 with the exception that the front yoke members do not have locking bolts thereby enabling each to be freely movable along the runners 11 forward of the front A-shaped frame members 12. The front axle 26 has each end extending through the respective apertures of the yoke members 27 in transverse relationship to the runners 11, with each free end having a wheel 24 mounted thereon and held in place by a cotter pin 25. It is to be clearly understood that the yoke construction just described for mounting the front axle 26 to the runners 11 is illustrative in character only, since other means are readily available for mounting the axle to the runners in movable relationship therewith in the manner described hereinbefore with respect to axle 21.

This arrangement just described results in a rear axle fixedly mounted on the runners 11 and a front axle movable along the runner 11 forward of the front A-shaped frame members 12. The purpose of having the front axle 26 movable is to enable the steering of the sled 10 in a manner to be more fully described hereinafter.

Figure 3:
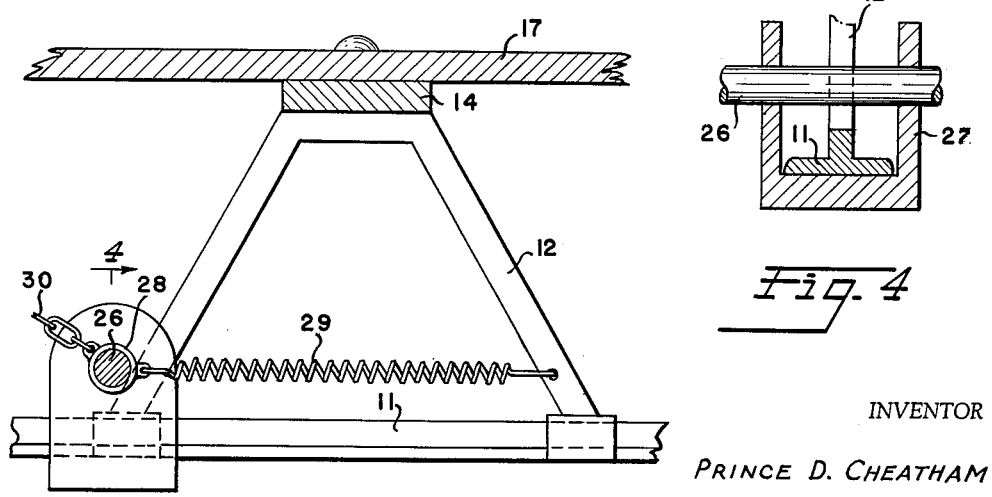
FIG. 3 is an enlarged fragmentary side elevation illustrating one side of the steering mechanism of the attachment made in accordance with the present invention.
Figure 4:
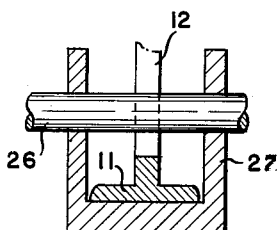
FIG. 4 is a view taken along lines 4—4 of FIG. 3.

To provide for the steering of the sled 10 when same has been converted into a wheeled vehicle, reference is now to be had to FIGS. 3 and 4. As shown, a pair of disk-like collars or washers 28 are mounted on the front axle 26 in laterally spaced relation to one another just inside of the respective yoke members 27 and are capable of movement thereon. Spring means 29, such as, for example, coil springs, are connected at one end to each of the collars 28 in any suitable manner, with the other end of each spring means being connected to the remote end of each of the front A-shaped frame members 12 by hooking the free end of the spring means in an aperture of the frame members 12. A steering line 30, such as, for example, a chain, cord, rope, or the like, is secured at one end to the opposite side of each of the collars 28 of the front axle 26, with the opposite free end of each of the steering lines 30 connected to the steering bar 19 of the sled 10 adjacent each end thereof by any suitable means, such as, for example, a nut and bolt assembly. The steering lines 30 will extend in a tight or non-slack position between the front axle 26 and the steering bar 19. This construction results in the spring means 29 and the steering line 30 along each side of the sled being in taut, longitudinal alignment with one another. Such an arrangement makes it possible to turn the steering bar of the sled to the right or left, with one wheel on the front axle 26 moving forward on the runner 11 by the action of one line 30, with the other wheel moving backward along the runner 11 due to relaxing of the other line 30 and its associated spring 29 urging one end of the axle rearwardly.

In the operation of the sled 10 when converted to a wheeled vehicle, the user may employ the wheeled sled for coasting, riding, or the like. When the user is desirous of steering the wheeled sled to the right, for example, he will actuate the steering bar 19 such that it will pivot on its pivot pin 20 with the right end of the steering bar coming back and the left end going forward. The action results in right side steering line 30 becoming lax, with the right side spring means 29 then urging the right side of the axle 26 rearwardly along the right runner 11, thus moving the wheel 24 back. Simultaneously with this action, the forward movement of the left side of the steering bar 19 results in the left steering line 30 being pulled forwardly, which, in turn, pulls the left end of the axle 26 and correspondingly the left wheel 24 forwardly along the left runner 11 against the action of the left spring means 29. When the turn has been completed, a release of pressure on the steering bar 19 results in its being automatically urged back into its normal position by the action of the left spring means 29, to permit the sled 10 to continue in a straight line of movement. In a turn to the left, the reverse of the operation just described will be performed.

To remove the conversion attachment of the present invention to permit the sled 10 to be used on snow or icy surfaces, the steering lines 30 are disconnected from the steering bar 19 and the spring means 29 are similarly disconnected from each of the front A-shaped frame members 12. The wheels are next removed from the front axle 26 and the front axle then pulled through the apertures of the front yoke members 27 resulting in the front yokes dropping from the runners 11. To remove the rear axle 21, the rear wheels 24 are removed and the rear axle 21 withdrawn through the apertures at the rear yokes 22, thereby resulting in the rear yokes dropping off the runners 11. The sled is now ready to be used as such. To mount the conversion attachment on the sled, the reverse of the operation just described may be employed. In either operation, the mounting on or removal of the attachment from the sled 10 requires only a few minutes and may be, due to its simplicity, performed by a child.

While there have been described herein what are at present considered preferred embodiments of the invention, it will be obvious to those skilled in the art that modifications and changes may be made therein without departing from the essence of the invention. It is therefore to be understood that the exemplary embodiment is illustrative and not restrictive of the invention, the scope of which is defined in the appended claim, and that all modifications that come within the meaning and range of equivalency of the claim are intended to be included therein.

I claim:

In a sled construction including a pair of spaced, parallel runners, a platform secured to said runners and a steering bar, the improvement of an attachment for converting said sled to a wheeled vehicle comprising a rear axle, means for fixedly mounting said rear axle in transverse relationship on the runners of the sled, a front axle, means for mounting said front axle in transverse longitudinally movable relationship on the runners, spring means secured at one end to each side of said front axle with the other end connected to the sled at a point rearwardly of said front axle for normally urging said front axle rearwardly in the direction of said rear axle, a wheel rotatably mounted to each end of the rear and front axles, and steering line means connected at one end to each of the said front axles with the other end connected to the steering bar of the sled, said steering line means being in longitudinal alignment with said spring means.

References Cited by the Examiner

UNITED STATES PATENTS

| | | | |
|---|---|---|---|
| 507,200 | 10/1893 | Ayres | 280—87.01 |
| 1,364,612 | 1/1921 | Church | 280—87.01 |
| 1,459,371 | 6/1923 | Kelly | 280—7.12 X |
| 1,493,291 | 5/1924 | Starnes | 280—87.01 X |
| 2,424,714 | 7/1947 | Shaw | 280—47.11 |
| 2,549,003 | 4/1951 | Pintak | 280—8 |
| 3,035,849 | 5/1962 | Groth | 280—87.01 |

ARTHUR L. LA POINT, *Primary Examiner.*

A. HARRY LEVY, *Examiner.*